United States Patent Office 3,247,114
Patented Apr. 19, 1966

3,247,114
LUBRICATING COMPOSITIONS CONTAINING HEXACHLOROCYCLOPENTADIENE DERIVATIVES
Ellis K. Fields, Chicago, Ill., assignor to Standard Oil Company, Chicago, Ill., a corporation of Indiana
No Drawing. Original application May 21, 1962, Ser. No. 196,496, now Patent No. 3,121,738, dated Feb. 8, 1964. Divided and this application July 29, 1963, Ser. No. 302,228
6 Claims. (Cl. 252—54.6)

This application is a division of copending application Serial No. 196,496, filed May 21, 1962, now U.S. Patent No. 3,121,738.

This invention relates to novel adducts of hexachlorocyclopentadiene. More particularly, it relates to novel adducts prepared by condensing hexachlorocyclopentadiene with 1,4-dihydrobenzoic acid and to lubricant compositions containing such adducts.

It has been discovered that hexachlorocyclopentadiene will condense with 1,4-dihydrobenzoic acid to form novel adducts which are new compositions of matter. The condensation reaction results in the formation of an adduct which comprises a hexacloro-, carboxy-substituted methanonaphthalene when one mole of hexachlorocyclopentadiene is reacted with one mole of 1,4-dihydrobenzoic acid, and a dimethanoanthracene when two molecular proportions of hexachlorocyclopentadiene are reacted with one molecular proportion of 1,4-dihydrobenzoic acid.

The product of the condensation of one mole of hexachlorocyclopentadiene and one mole of 1,4-dihydrobenzoic acid results in a hexachloro-carboxy-substituted naphthalene which is 1,2,3,4,9,9-hexachloro-5-carboxy-1,4,4a,5,8,8a-hexahydro-1,4-methanonaphthalene having the formula

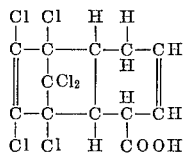

The product of the condensation of two moles of hexachlorocyclopentadiene and one mole of 1,4-dihydrobenzoic acid results in a hexachloro, carboxy-substituted anthracene with is 1,2,3,4,5,6,7,8,11,11,12,12-dodecachloro-9 - carboxy - 1,4,4a,5,8,8a,9,9a,10,10a-decahydro-1,4,5,8-dimethanoanthracene having the formula

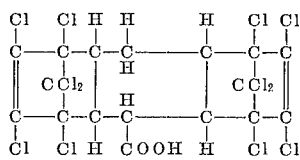

The novel adducts of this invention are prepared by heating the hexachlorocyclopentadiene and 1,4-dihydrobenzoic acid in the mole ratios of 1:1 and to 2:1 at temperatures of from about 80° C. to about 150° C., preferably 110 to 140° C., for a period of time sufficient to form the adduct, usually from about 10 to about 100 hours, preferably 50 to 75 hours. The condensation reaction is preferably conducted at atmospheric pressure and can be conducted at super atmospheric pressure, for example, at pressures up to about 200 pounds per square inch. If so desired, the reaction can be carried out in organic high-boiling solvents such as tetrachloroethane and pentachloroethane.

The preparation of 1,4-dihydrobenzoic acid is given in Example 1.

EXAMPLE 1

To a stirred mixture of 10 g. of benzoic acid and 30 ml. methanol in 350 ml. of liquid ammonia maintained at a temperature of −35° C. was added 6 g. of sodium in small pieces over a 70-minute period. Then 14.6 g. ammonium chloride was added to the reaction mixture. The temperature of the reaction mixture was then allowed to rise sufficiently to allow the ammonia to evaporate. After the ammonia was removed from the reaction mixture the residue was treated with ice. The aqueous solution was then acidified with hydrochloric acid and subsequently extracted with four 100 ml. portions of ether. The ether extract was washed with water, dried over magnesium sulfate and distilled, giving 7.2 g. (71%) of 1,4-dihydrobenzoic acid, boiling at 91° C. at 0.7 mm., $n_D^{20}$ 1.5055, melting point 12° C.

The phenylhydrazine salt of the 1,4-dihydrobenzoic acid obtained was prepared and crystallized from alcohol, melting point 80–80.5° C. M. E. Kuehne and B. F. Lambert, J. Am. Chem. Soc., 81, 4278 (1959) give for 1,4-dihydrobenzoic acid $B_{001}$ 96–98° C., $n_D^{20}$ 1.6112–1.115, M.P. phenylhydrazine salt, 81° C. H. Plieninger and G. Ege, Angew Chem., 70, 505 (1958) give M.P. 10–15° C., no boiling point.

EXAMPLE 2

A mixture of 1.24 g. (0.01 mole) of the 1,4-dihydrobenzoic acid of Example 1 and 1.62 ml. (0.01 mole) of hexachlorocyclopentadiene was heated at 120° C. for 72 hours. The solids were recrystallized twice from benzene giving 3.2 g. (80 mole percent) of white crystals of 1,2,3,4,9,9 - hexachloro - 5-carboxy-1,4,4a,5,8,8a-hexahydro-1,4-methanonaphthalene, melting at 270° C. with decomposition. Chlorine analysis calculated for $C_{12}H_8Cl_6O_2$: 53.2%; found: 53.0%.

EXAMPLE 3

A mixture of 1.24 g. (0.01 mole) of 1,4-dihydrobenzoic acid of Example 1 and 3.23 ml. (0.02 mole) of hexachlorocyclopentadiene was heated at 120° C. for 72 hours. The solids of the reaction mixture were recrystallized three times from benzene to give 3.8 g. (56 mole percent) of white crystals of 1,2,3,4,5,6,7,8,11,11,12,12-dodecachloro-9 - carboxy - 1,4,4a,5,8,8a,9,9a,10,10a-decahydro-1,4,5,8-dimethanoanthracene melting at 339–340° C. with decomposition. Analysis calculated for $C_{17}H_8Cl_{12}O_2$: C, 30.5%; H, 1.2%; Cl, 63.5%. Analysis found: C, 30.2%; H, 1.4%; Cl, 62.4%.

Infrared analysis showed the presence of strong carbonyl bonds at 5.9 microns for the compounds of Examples 2 and 3.

The herein described adducts of hexachlorocyclopentadiene and 1,4-dihydrobenzoic acid are particularly suitable for use in amounts of from 0.01% to about 10% as addition agents for lubricating oils to impart extreme pressure properties to such lubricants.

Suitable lubricating base oils are hydrocarbon oils, e.g. petroleum oils, synthetic hydrocarbon lubricating oils such as those obtained by the polymerization of hydrocarbons, and other synthetic lubricating oils such as alkylene oxide type oils, for example, the "Ucon Oils" marketed by Carbide and Carbon Corporation, polycarboxylic acid ester-type oils such as esters of adipic acid, sebacic acid, azelaic acid, etc. and other synthetic lubricating oils.

Lubricating oils containing the herein described derivatives exhibit excellent extreme pressure properties as demonstrated by the data in Table I. The Almen values were determined on the Almen Tester in the manner described in the Proceedings of the 15th Annual Meeting American Petroleum Institute 15, sect. III, 60 (1934) or the Oil and Gas Journal 33, No. 26, 123, 126 (1934).

Table I

| Product | Concentration Percent [b] | Almen Test | |
|---|---|---|---|
| | | Pass (lbs.) | Fail (lbs.) |
| Control [a] | 0 | 6 | 8 |
| Example III | 0.2 | 20 | 22 |
| | 0.5 | 30+ | |

[a] Solvent-extracted SAE 5 W. oil.
[b] Concentration of additive in the control oil.

While this invention has been described in connection with the use of the herein described additives and lubricant compositions, their use is not limited thereto but the same can be used in products other than lubricating oils, such as for example, fuel oils, insulating oils, greases, nondrying animal and vegetable oils, waxes, and asphalts. The novel adducts of this invention can also be used as pesticides and insecticides, either as free acids or as their salts with inorganic ions or amines or esters.

Concentrates of a suitable oil base containing more than 10%, e.g. for about 15% to about 50% or more, of the herein described derivatives, alone or in combination with more than 10% of other additives, can be used for blending with other oils in proportions desired for the particular condition or use to give a finished product containing from about 0.001 to about 10% of the described derivative.

Lubricant composition containing the herein described derivatives can contain other addition agents such as, for example, antioxidants, pour point depressors, V.I. improvers, etc.

Unless otherwise stated, percentages given herein and in the appended claims are weight percentages.

Thus, having described the invention, what is claimed is:

1. A lubricant composition comprising a major proportion of a lubricating oil and from about 0.001% to about 10% of a compound selected from the group consisting of 1,2,3,4,9,9-hexachloro-5-carboxy-1,4,4a,5,8,8a-hexahydro-1,4-methanonaphthalene and 1,2,3,4,5,6,7,8,11,11,12,12 - dodecachloro - 9 - carboxy-1,4,4a,5,8,8a,9,9a,10,10a-decahydro-1,4,5,8-dimethanoanthracene.

2. The composition of claim 1 wherein said compound is 1,2,3,4,9,9 - hexachloro-5-carboxy-1,4,4a,5,8,8a-hexahydro-1,4-methanonaphthalene.

3. The composition of claim 1 wherein said compound is 1,2,3,4,5,6,7,8,11,11,12,12-dodecachloro-8-carboxy-1,4,4a,5,8,8a,9,9a,10,10a - decahydro - 1,4,5,8-dimethanoanthracene.

4. A lubricant composition comprising a major proportion of a hydrocarbon lubricating oil and from about 0.001% to about 10% of a compound selected from the group consisting of 1,2,3,4,9,9-hexachloro-5-carboxy-1,4,4a,5,8,8a-hexahydro-1,4-methanonaphthalene and 1,2,3,4,5,6,7,8,11,11,12,12 - dodecachloro-9-carboxy-1,4,4a,5,8,8a,9,9a,10,10a-decahydro-1,4,5,8-dimethanoanthracene.

5. The composition of claim 4 wherein said compound is 1,2,3,4,9,9-hexachloro - 5-carboxy-1,4,4a,5,8,8a-hexahydro-1,4-methanonaphthalene.

6. The composition of claim 4 wherein said compound is 1,2,3,4,5,6,7,8,11,11,12,12 - dodecachloro-9-carboxyl-1,4,4a,5,8,8a,9,9a,10,10a - decahydro-1,4,5,8-dimethanoanthracene.

References Cited by the Examiner
UNITED STATES PATENTS

| 2,733,248 | 1/1956 | Lidov | 252—54.6 |
| 2,971,913 | 2/1961 | David et al. | 252—54.6 |

DANIEL E. WYMAN, *Primary Examiner.*